(12) United States Patent
Ma et al.

(10) Patent No.: US 7,116,649 B2
(45) Date of Patent: Oct. 3, 2006

(54) MULTIPLE-USER CDMA WIRELESS COMMUNICATION SYSTEM

(75) Inventors: Yugang Ma, Singapore (SG); Xiaobing Sun, Singapore (SG)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 10/006,754

(22) Filed: Nov. 8, 2001

(65) Prior Publication Data
US 2002/0060999 A1 May 23, 2002

(30) Foreign Application Priority Data
Nov. 10, 2000 (SG) .............................. 200006535-9

(51) Int. Cl.
*H04L 12/28* (2006.01)
*H04J 3/16* (2006.01)
(52) U.S. Cl. ..................... 370/329; 370/335; 370/401; 370/469
(58) Field of Classification Search ................ 370/441, 370/342, 320, 335, 328–329, 508, 467, 479, 370/332, 401, 469
See application file for complete search history.

(56) References Cited

U.S. PATENT DOCUMENTS

| | | | |
|---|---|---|---|
| 5,305,349 A | 4/1994 | Dent | |
| 6,026,115 A | 2/2000 | Higashi et al. | |
| 6,483,866 B1 * | 11/2002 | Suzuki | 375/149 |
| 6,570,918 B1 * | 5/2003 | Rademacher | 375/232 |
| 6,647,015 B1 * | 11/2003 | Malkemes et al. | 370/401 |

OTHER PUBLICATIONS

Sergio Verdu, "Minimum Probability of Error for Asynchronous Gaussian Multiple-Access Channels," IEEE Transactions on Information Theory, vol. IT-32. pp. 85-96, Jan. 1986.
Varanasi M. K., Aazhang B., "Near-Optimum Detection in Synchronous Code-Division Multiple-Access Systems," IEEE Transaction on Communications, vol. 39, pp. 725-736, May 1991.
Xiaodong Wang and H. Vincent Poor, Blind Multiuser Detection: A Subspace Approach,: IEEE Transactions on Information Theory, vol. 44, No. 2, Mar. 1998.
Honig M., Madhow U., Verdu S., "Blind Adaptive Multiuser Detection." Transactions on Information Theory, vol. 41, pp. 944-960, Jul. 1995.
Markku J. Heikkila et al., "Interference Suppression in CDMA Downlink through Adaptive Channel Equalization." IEEE Vehicular Technology Conference, 1999, pp. 978-982.

(Continued)

*Primary Examiner*—Afsar Qureshi
(74) *Attorney, Agent, or Firm*—Frommer Lawrence & Haug LLP; William S. Frommer; Paul A. Levy

(57) ABSTRACT

A receiver for CDMA signals, in which data intended for transmission to multiple intended receivers is spread by respective orthogonal spreading codes and scrambled by an aperiodic random scrambling code, includes a processing branch for each of a number of base stations from which the receiver may pick up CDMA signals. Each processing branch performs both channel equalisation based on a set of weights for that branch, and a decoding operation. The outputs of the branches are combined to produce a combined signal which is used both for determining the data intended for the receiver, and in a feedback loop to improve the sets of weights. The receiver is reliable even in the presence of mutipath fading and during soft handover.

8 Claims, 2 Drawing Sheets

OTHER PUBLICATIONS

Stefan Werner, Jorma Lilleberg, "Downlink Channel Decorrelation in CDMA Systems with Long Codes." IEEE Vehicular Technology Conference, 1999, pp. 1614-1617.

Irfan Ghauri, Dirk T. M. Slock, "Linear Receivers for the DS-CDMA Downlink Exploiting Orthogonality of Spreading Sequences." IEEE Vehicular Technology Conference, 1998, pp. 650-654.

Hooli, K., Latva-aho, M. and Juntti, M., "Multiple Access Interference Suppression with Linear Chip Equalizers in WCDMA Downlink Receivers," IEEE Global Telecommunications Conference, 1999, pp. 467-471.

Hooli, K., Juntti, M., and Latva-aho, M., "Inter-path Interference Suppression in WCDMA Systems with Low Spreading Factors," IEEE Vehicular Technology Conference, 1999, pp. 421-425.

* cited by examiner

MULTIPLE-USER CDMA WIRELESS COMMUNICATION SYSTEM

BACKGROUND OF THE INVENTION (1) Field of the Invention

This invention relates to code-division-multiple-access (CDMA) wireless communication systems, in which multiple base stations each transmit a respective CDMA signal. In particular, the present invention relates to a methods and receivers for recovering data from the CDMA signals transmitted by the multiple base stations.

(2) Description of the Related Art

CDMA is a crucial technology for third-generation (3G) wireless communication systems. A known CDMA system, which is illustrated in FIG. 1, includes base stations 1, 2 each defining a "cell", that is an area surrounding the base station in which transmissions from the base station may be received. Users are provided with mobile communications devices 3, 4 (e.g. mobile phones), which communicate with the base station associated with the cell in which they are located, and in particular receive from that base station a "forward link" wireless CDMA signal.

FIG. 2 shows communication from base station 1 transmitting a CDMA signal to a certain mobile device 3. Labelling the K mobile devices 3 in the cell of base station 1 by integer index k=1, . . . K, the CDMA signal is generated using a spread code for each user, denoted by $C_k^1$, and a scrambling code for base station 1, denoted spm$^1$. Each $C_k^1$ signal varies at time increments called "chips" and has a period N chips (a "symbol"), and the spreading codes are orthogonal in the sense that the sum over the chips of one symbol of the product of the spreading signals for two different receivers is zero.

A conventional receiver provided in device 3 can receive data intended for that device 3 very well over ideal channels for which all signals generated by users are orthogonal to each other. However, as shown schematically in FIG. 2, in a real environment the signal from base station 1 received by the receiver of a mobile device 3 is distorted seriously.

In other known systems, a RAKE receiver is used to handle the multipath problem [1,2]. The RAKE receiver combines several path components for one user to increase the signal to noise ratio (SNR). Its performance is optimal when there is a single-user. However, when the received signals include signals from other users, inter-path interference will destroy the orthogonality between users, and cause multiple-access interference (MAI). Moreover, if a receiver is near the edge of a cell in the cellular CDMA systems, its signal is subject to interference not only from intra-cell MAI, but also from MAI due to other cells. The MAI will degrade the performance of the receiver seriously.

Some MAI suppression methods have been published in the literature [3,4,5,6]. These methods are complex, or cannot handle a long scrambling code. Hence, they are not suitable for use in a CDMA forward link of a mobile phone system.

Since the signals of users in the forward link of a cell pass through the same channel before they reach the receiver, it is possible for us to adopt channel equalisation to recover the orthogonality between signals so as to suppress MAI and improve the performance of the receiver. In recent papers [7,8,9,10,11], methods for MAI suppression in a CDMA forward link using channel equalisation have been presented. They can handle an aperiodic scrambling code, and the complexity is low. However, these methods consider only single cell multipath channel equalization, and hence cannot suppress MAI due to other cells. Their performance will degrade when a mobile device is near the edge of one cell and subject to MAI from one or more other cells simultaneously. Besides, all of the methods in [7,8,9,10,11] adopt three independent steps to complete the total function, namely channel equalization, descrambling/despreading and decision. Since the adaptive loop includes only a channel equalizer, a channel estimation process must be completed before the channel equalization. In addition, many existing channel estimation approaches require a knowledge the order of the multipath channel, which is unknown in a real environment, and can be only estimated approximately. The estimation errors in channel order and weights will be brought into the equalizer and influence the performance of the equalizer. Furthermore, as the channel parameters change, these methods need to adjust the channel estimation and channel equalization repeatedly to match these changes. Such approaches waste time and lack robustness.

BRIEF SUMMARY OF THE INVENTION

The present invention seeks to provide a method for detecting data efficiently and robustly in a CDMA communication system with multipath channels. This general problem is of relevance in many technical fields including cellular wireless communications, satellite communications, wireless local loop, etc. One of its major applications is in data detection in a forward link of a CDMA cellular mobile system to provide MAI suppression in a multi-cell environment.

In general terms the present invention, which has both method and apparatus aspects, proposes that a receiver for CDMA signals includes an adaptive loop which includes both channel equalisation and a decoding operation. The result of the decoding is used both for estimating the data in the CDMA signals intended for the receiver, and in a feedback loop to adjust the setting of the weights. Thus, the proposal includes an adaptive loop, which combines channel equalization and data detection, and hence embodiments of the method may require less information for channel equalisation and data detection than known methods do.

Preferably, the receiver includes a processing branch for each of a number of cells from which the receiver may pick up CDMA signals. Each processing branch performs both channel equalisation based on a set of weights for that branch, and a decoding operation. The outputs of the branches are combined to produce a combined signal which is used both for estimating the data in the CDMA signals intended for the receiver, and in the feedback loop to adjust the setting of the weights.

Preferably, the method can suppress intra-cell and/or inter-cell MAI by multi-channel equalization even in the soft hand over period, in which the receiver suffers interference from other-cell MAI most seriously.

The main advantages of preferred embodiments of the invention are that: 1) their performance is much better than that of RAKE receiver used in current CDMA systems; 2) they have the capability to suppress intra-cell and inter-cell MAI, so that the performance is improved, especially in a soft hand over period; 3) they do not require extra channel estimation, and only adjust channel equalization to track any changes in the channel, and thus they are more robust in a time-varying environment. 4) They have low complexity and can handle long scrambling code, and hence are suitable in a mobile phone application.

Specifically, in a first aspect the invention proposes a receiver for a communication system including a plurality of base stations and a plurality of receivers, each base station transmitting a respective CDMA signal including data intended for each of a set of one or more of the receivers, the data intended for each of the receivers being encoded in the CDMA signal using a respective spreading code for that receiver;

the receiver including:

reception means for receiving a signal including CDMA signals;

at least one branch processing means, the reception means being capable of transmitting the received signal to each branch processing means, the or each branch processing means corresponding to a respective one of the base stations and arranged to modify the received signal by the operations of:

(i) data equalisation, based on a respective filter with a respective set of weights; and (ii) decoding, using the spreading code for the receiver;

decision means for using the outputs of the at least two branch processing means to generate to generate an error signal and an estimate of the data in the received signal intended for the receiver; and adaptation means for modifying said sets of weights using the error signal.

Preferably, there are a plurality of branch processing means. If the receiver is used in an environment, e.g. near a single base station, where the signal from one base station is much stronger than others, or indeed in which only one base station is transmitting signals to that receiver, then the receiver may either (i) transmit the received signal over only one of the branch processing means, or (ii) disable all but one of the branch processing means, e.g. by arranging that the other branches assume that the scrambling and spreading codes are zero. For this purpose the receiver is preferably provided with means to determine the number of significant CDMA signals and arrange that the number of branch processing means employed is the same, i.e. one or more.

In communication systems in which the CDMA signal from each base station is scrambled using a scrambling code for the base station, the decoding also includes de-scrambling.

The invention may also be expressed, in a second aspect, as a method, e.g. to be carried out by a receiver.

Specifically in the second aspect, the invention proposes a method of extracting data intended for a first user from CDMA signals, each broadcast by a respective base station, each CDMA signal including data intended for the first user and data intended one or more other users encoded using a respective spreading code;

the method including:

receiving a signal including the CDMA signals;

transmitting the received signal along one or more processing branches corresponding to different respective said base stations;

in each branch modifying the received signal by the operations of:

(i) data equalisation in respect of the corresponding base station, based on a respective set of weights; and (ii) decoding, using the spreading code for the first user;

(iii) using the outputs of the processing branch(es) to derive an error signal, and an estimate signal indicative of the data in the received signal intended for the first user; and modifying said sets of weights using the error signal.

Furthermore, the present invention proposes a communications system employing receivers according to the first aspect of the invention.

BRIEF DESCRIPTION OF THE DRAWINGS

An embodiment of the invention will now be described, for the sake of illustration only, with reference to the accompanying drawings in which.

DETAILED DESCRIPTION OF THE INVENTION

In the following explanation of the embodiment, the number of base stations (or equivalently cells) from which a given receiver (user) can receive CDMA signals is denoted by I, and the base stations (cells) are labelled by the index i, i=1, . . . ,I.

The number of receivers of the transmission system is K, labelled by an index k, k=1, . . . ,K. The data bit for user k in cell i is denoted by $b_k^i$. Note that when the user k is near the edge of a cell, during the soft hand over period, the data from several base stations is equal, and we can remove the superscript i. A mobile phone which is near only a single base station (e.g. that including cell 1) communicates only with its base station, and in this case the data for the k-th user in cell 1 is different from that in cell 2.

The CDMA signal is generated employing, for each of the K users, a respective spreading code $C_k^i$. Each spreading code is constant for time intervals called chips (i.e. with sudden changes only at ends of chips) and has a period of N chips, i.e. one "symbol". Thus, we label chips as (nN+m), where n labels the symbols and m is in the range 1 to N. For each base station, the K spreading codes are orthogonal in the sense that for k≠k', $$\sum_{m=1}^{N} c_k^i(nN+m)c_{k'}^i(nN+m) = 0.$$

Figure 1:
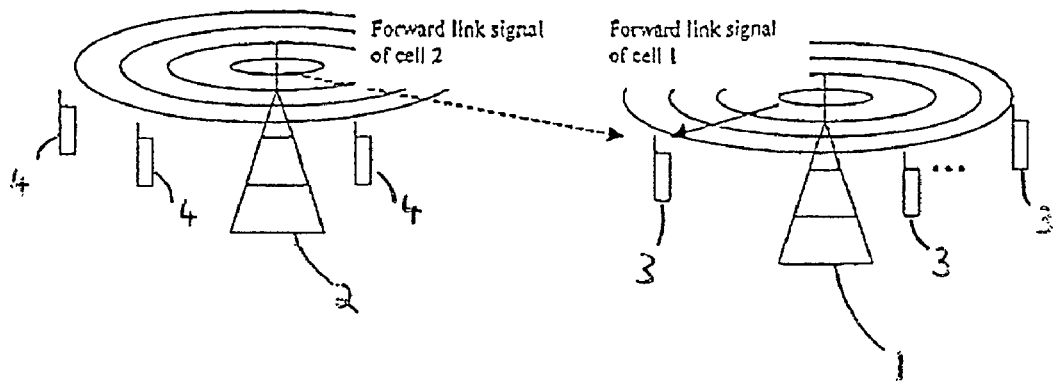
FIG. 1 is the schematic diagram of a forward link in a known wireless cellular CDMA communication system.

In the communication system shown in FIG. 1 (though not necessarily every communication system) i-th base station is associated with an (aperiodic) base station code $spm^i(nN+m)$, The CDMA signal transmitted by base station i is denoted by $$x^i(nN+m) = spm^i(nN+m)\sum_{k=1}^{K} \alpha_k^i b_k^i(n) c_k^i(nN+m) \quad (1)$$

where $\alpha_k^i$ is the amplitude (which depends on the position of the user k within cell i), within the i-th base station signal, of the signal generated from the k-th user.

Thus, (1) expresses the fact that users' signals are combined synchronously in cell i, by a process in which they are encoded (i.e. spread and scrambled) using the users' respective spreading codes and using the scrambling code.

Now we turn to the signal received by a receiver (which may be part of a mobile communication device, such as a mobile phone) from a plurality of the base stations.

Let G be the number of measurements made by the receiver during each chip. For example, G may be the number of antennas at the receiver, or alternatively the number of samples taken during each chip by a single antenna of the receiver. Thus, labelling the G measurements made by the receiver in a single chip duration by an index g (g=1, . . . ,G), the measurements at the receiver can be written as $y_g$ (nN+m).

The multipath fading channel to the receiver from each respective i-th base station can be modelled as a FIR process having a length of L times the chip duration, and FIR coefficients $h_g^i(l)$ where l (l=1, . . . ,L) is an index labelling the L taps.

Defining for each symbol a respective vector y(n) with G(N+L−1) components, $[y_1(nN+1), \ldots, Y_G(nN+1), \ldots, y_1(nN+N+L+1), \ldots, Y_G(nN+N+L-1)]^T$ (where T denotes transpose), y(n) is given by:

$$y(n) = \sum_i T^i x^i(n) + \xi(n) \quad (2)$$

where $x'(n) = [x^i(nN-L+2), \ldots, x^i(nN+N+L-1)]^T$, a vector of N+2L−2 components, $$T^i = \begin{bmatrix} h_1^i(L) & \cdots & h_1^i(1) & 0 & 0 & \cdots & 0 \\ \vdots & & \vdots & \vdots & \vdots & & \vdots \\ h_G^i(L) & \cdots & h_G^i(1) & 0 & 0 & \cdots & 0 \\ 0 & h_1^i(L) & \cdots & h_1^i(1) & 0 & \cdots & 0 \\ \vdots & \vdots & & \vdots & \vdots & & \vdots \\ 0 & h_G^i(L) & \cdots & h_G^i(1) & 0 & \cdots & 0 \\ \vdots & & & & \vdots & & \\ 0 & \cdots & 0 & 0 & h_1^i(L) & \cdots & h_1^i(1) \\ \vdots & & \vdots & \vdots & \vdots & & \vdots \\ 0 & \cdots & 0 & 0 & h_G^i(L) & \cdots & h_G^i(1) \end{bmatrix}, \quad (3)$$

a matrix with (N+L−1)G×(N+2L−2) components, and $\xi(n)$ is a white Gaussian noise vector.

Figure 2:
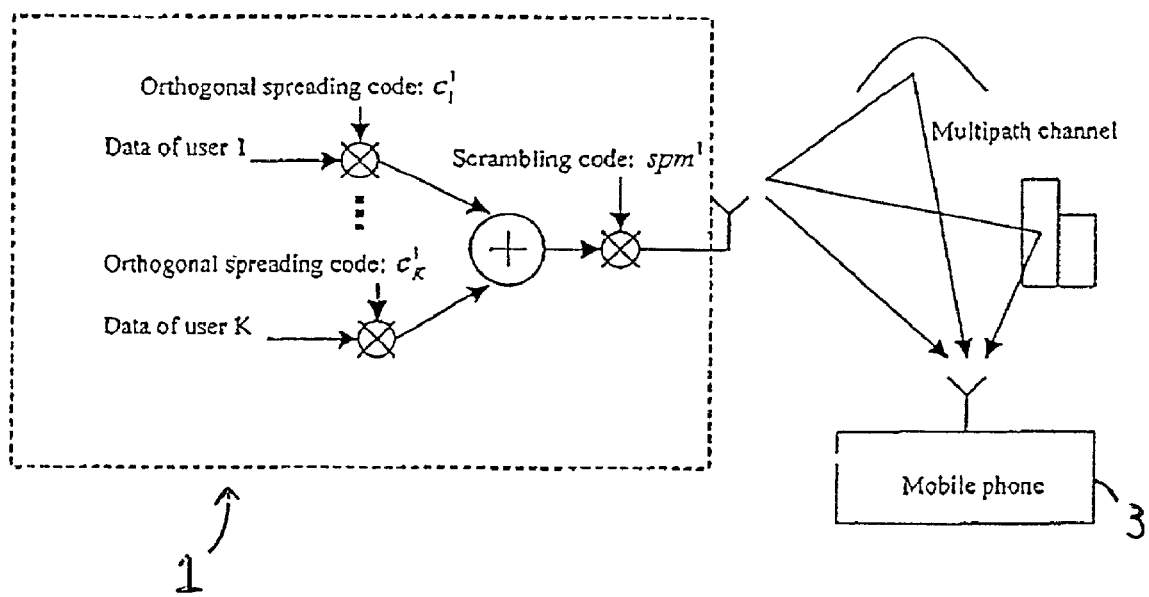
FIG. 2 is the schematic representation of the generation of a CDMA signal in a base station from user data which is combined synchronously and scrambled by a base station code, and of the transmission of the CDMA signal along a multipath channel.

We now turn to the analysis of this data performed by a receiver according to an embodiment of the invention. This receiver can be used as part of a system according to FIGS. 1 and 2.

Figure 3:
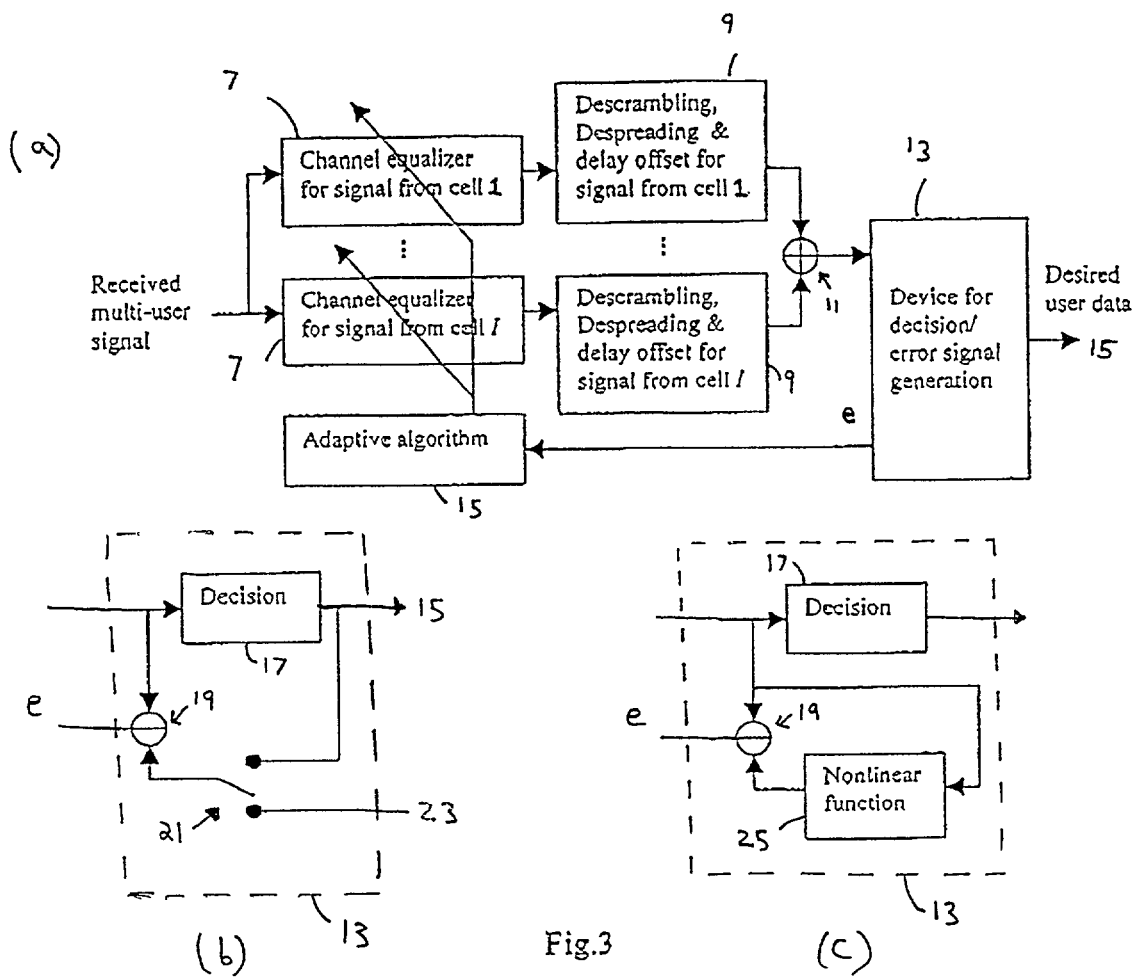
FIG. 3, which is composed of portions 3(a) to 3(c), illustrates the structure of an embodiment of a receiver according to the present invention.

The receiver is illustrated in FIG. 3(a). It includes I channel equalisers 7, each corresponding to a certain i. The i-th receives the measurements $y_g(nN+m)$ and uses a set of G(2M+1) weights, where M is any positive integer, which is called data set $w^i$. The equalisers 7 in FIG. 3 may be of a known type such as a FIR or IIR filter. The outputs of the channel equalisers 7 are transmitted to respective units 9 which descramble and despread the signal and correct the delay. We call the combination of an equaliser 7 and the corresponding unit 9 a "branch". Note that if the base station corresponding to a given branch does not employ a spreading code then the unit 9 of that branch does not perform descrambling.

The outputs of units 9 are combined by an adder 11, and transmitted to a unit 13 for generating a decision about which data the base stations intended to transmit to the receiver (the result of this decision is transmitted from the receiver as output 15). Unit 13 also generates an error signal (output e). The error signal is transmitted to an adaptive algorithm 15, and used to modify the weights used by the channel equalisers 7.

The steps performed by the equaliser are as follows:

1. Obtaining signal measurement of multi-user CDMA signals transmitted by one or multiple base stations. As explained above, the spreading codes for users in each base station are orthogonal, and the sum of spread signals is scrambled by an aperiodic random code.

2. For each symbol n, constructing from the signal measurements a G(2M+1)×N input data matrix Y(n) containing a plurality of row data vectors. G row vectors are comprised of the signal measurements within a symbol period. Specifically, $$Y(n) = \begin{bmatrix} y_1(nN-M+1) & \cdots & y_1(nN+N-M) \\ \vdots & & \vdots \\ y_G(nN-M+1) & \cdots & y_G(nN+N-M) \\ \vdots & & \vdots \\ y_1(nN+1) & \cdots & y_1(nN+N) \\ \vdots & & \vdots \\ y_G(nN+1) & \cdots & y_G(nN+N) \\ \vdots & & \vdots \\ y_1(nN+M+1) & \cdots & y_1(nN+N+M) \\ \vdots & & \vdots \\ y_G(nN+M+1) & \cdots & y_G(nN+N+M) \end{bmatrix}. \quad (4)$$

Figure 4:
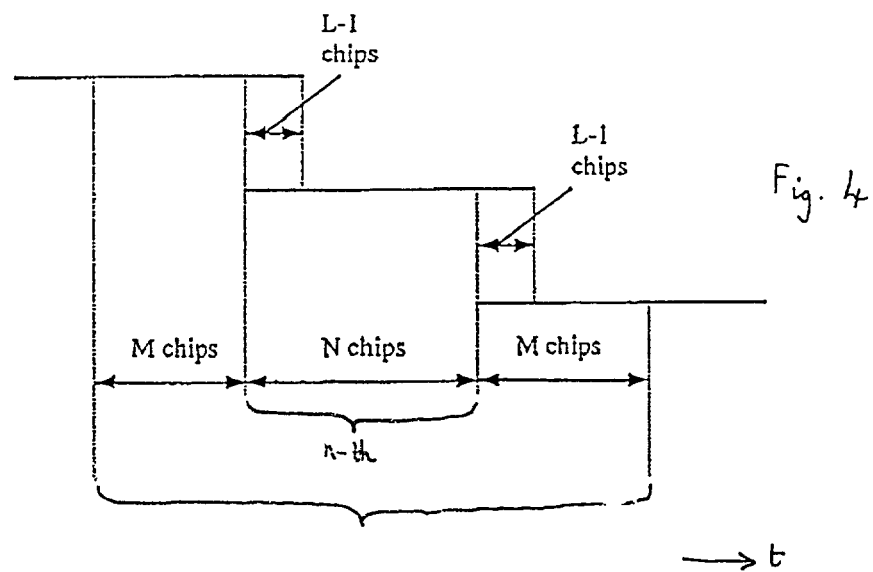
FIG. 4 is a representation of the signal measurement period used to construct an input data matrix to detect the n-th symbol of user k in the embodiment of FIG. 3.

The significance of Y(n) can be seen from the illustration of FIG. 4. The n-th symbol of generates signals received by the receiver up to L−1 chips later. The equalisers employ the y values from a period M chips before the n-th symbol, the N chips during the n-th symbol, and the M following chips (as indicated by the backet at the bottom of the figure) to extract the bit of data which is transmitted to the receiver during the n-th symbol of the transmission.

3. Each column of the above data matrix passes through each equalizer 7, to obtain a set of G estimate values for an equalized multi-user chip. GN estimation values for N multi-user chips will be obtained when the whole data matrix passes through the equalizer 4. Each channel equalizer branch further contains a unit 9 which receives the estimation values for the multi-user chips, and descrambles and despreads them using locally generated scrambling codes and the spreading code for the receiver. The outputs of the channel equalizer branches will be combined by adder 11, to obtain a total output. Note that if a mobile device is near its own base station, the intra-cell signal is much larger than that of other cells. The MAI from other cells can be ignored, and hence the output of the channel equalizer branch for the other-cells may be set to zero by setting the scrambling and spreading codes to zero. By contrast, if the mobile device is near the edge of the cell, it will receive signals from two or more base stations simultaneously, e.g. during the process of changing cells known as soft hand over. Thus, the importance of the signals from the different cells is equal, but the CDMA signal for each different cells includes data intended for a different set of other users.

Specifically, the i-th unit 9 may employ the vector $$C_k^1(n) = \text{diag}(spm^i(nN) \ldots spm^i(nN+N-1) \cdot c_k^i) \quad (5)$$

where $c_k^i = [c_{k1}^i \ldots c_{kN}^i]^T$ is the spreading code waveform of user k in cell i. Note that if a given base station i does not employ scrambling the eqn. (5) is varied by setting $spm^i$ equal to 1.

5. Each channel equalizer branch in the receiver should generate the same estimate of the data intended for that receiver. Therefore, when the adder 11 combines outputs from all branches, the result will increase the SNR of the data estimate for that receiver. This output of the adder may be written as $$\hat{b}_k(n) = \sum_i c_k^{iH}(n) Y^H(n) w^i(n), \quad (6)$$

where $( \ )^H$ means the Hermitian transpose. Note that, since this is a matrix multiplication, other embodiments of the invention are possible which perform the multiplication as (CY)w rather than as C(Yw).

6. The output signal of the adder 11 is used by the unit 13 (specifically by a decision unit 17 of the unit 13) to decide which data the base station intended to send to the receiver. This is output as signal 15, e.g. to a loudspeaker unit of the mobile device. It may be $\hat{d}_k(n) = \text{sign}(\text{real}(\hat{b}_k(n)))$, where "real" and "sign" denote the real and sign functions respectively. Note that $\hat{b}$ is generally complex because of noise and errors in the equalisers 7, however it is the real part of $\hat{b}$ which is useful. Y and W are generally complex, and C may be complex or real.

We turn now to the process of setting the equalisers 7. Initially, these weights may be set to any predetermined vector (e.g. (1,1,1,1, . . . 1) for any one or more base station which for which the CDMA signal is significant, and (0,0, 0, . . . 0) for all other base stations), and the embodiment modifies them iteratively. For this purpose the unit 13 provides a second output, e, which is an error signal. The error signal is transmitted to a unit 15 which performs an adaptive algorithm, to modify the data sets used by the equalisers 7.

If a training sequence is available, then the unit 13 may be constructed as shown in FIG. 3 (b). It includes an extra input 23, for applying a known training sequence. When the CDMA signal includes the training sequence, a switch 21 is set to transmit the input 23 to a subtracter 19 which also receives the output of the adder 11. Subtracter 19 transmits the difference between its two inputs as error signal e. The output of the adder 11 will be compared with the training sequence to obtain the error signal. The error signal will control the adaptive algorithm to adjust the weights of equalizers. When a predefined criterion is met, e.g. when the variance of the error signal is smaller than a predefined constant, the switch 21 switches so that the subtracter 19 receives the output of the decision unit 17. We call this the data detection mode. Thus, $e(n) = d_k(n) - \hat{b}_k(n)$ in the training mode, where $d_k(n)$ is the training data, and $e(n) = \hat{d}_k(n) - \hat{b}_k(n)$ in the data detection mode.

By contrast, if no training sequence is available, the embodiment can still perform channel equalization and data detection efficiently when signal-to-noise-ratio (SNR) is high. The unit 13 in this case is preferably implemented as shown in FIG. 3 (c). The output of the adder 11 is transformed by a unit 25 which performs a nonlinear function, and the output of the adder 11 and the non-linear unit 25 are fed to the subtracter 19. For example, e(n) may be given by $e(n) = \Im(\hat{b}_k(n)) - \hat{b}_k(n)$, where $\Im$ is the Godard non-linear function.

In either of these two cases, the construction of the unit 15 can be the same. The adaptive algorithm performed by unit 15 may be a steepest descent, recursive least-square or pseudo-linear regress algorithm. A steepest descent algorithm is simply:

$$w^i(n+1) = w^i(n) + \mu Y(n) C_k^i(n) e(n). \quad (7)$$

where $w^i(n)$ is the equalizer weight vector for branch i in the n-th iteration and $\mu$ is a step-size of the adaptive algorithm (which may be predefined).

Although the invention has been explained above with reference to particular embodiments, the invention is not limited in this respect and many variations are possible within the scope of the invention as will be clear to a skilled person.

REFERENCES

The following citations are incorporated herein in their entirety by reference:

[1] U.S Pat. No. 5,305,349, "Quantised coherent rake receiver"
[2] U.S Pat. No. 6,026,115, "Rake receiver"
[3] "Minimum probability of error for asynchronous Gaussian multiple access channels", Verdu S., IEEE Transactions on Information Theory, vol. IT-32, p85, January 1986.
[4] "Near-optimum detection in synchronous code-division multiple-access system", Varansi M.K., Aazhang. B., IEE Transactions on Communications, vol. 39, p725, May 1991.
[5] "Blind multi-user detection: a subspace approach", Wang X. and Poor H. V., IEEE transactions on Information Theory, vol. 44, no.2, March 1998.
[6] "Blind adaptive multi-user detection", Honig. M., Madhow U., Verdu S., IEEE Transactions on Information Theory, vol.41, p944, July 1995.
[7] "Interference suppression in CDMA downlink through adaptive channel equalisation", Heikkila M.J., IEEE Vehicular Technology Conference, 1999.
[8] "Downlink channel decorrelation in CDMA systems with long codes", Werner S., Lilleberg J., IEEE Vehicular Technology Conference, 1999.
[9] "Linear receivers for the DS-CDMA downlink exploiting orthogonality of spreading sequences", Ghauri I, Slock D.T.M, IEEE Vehicular Technology Conference, 1998.
[10] "Multiple access interference suppression with linear chip equaliser in WCDMA downlink receivers", Hooli K., Latva-aho M. and Juntti M., IEEE Globe Communications Conference, 1999.
[11] "Interpath interference suppression in WCDMA systems with low spreading factors," Hooli K., Latva-aho M. and Juntti M., IEEE Vehicular Technology Conference 1999.

The invention claimed is:

1. A receiver for a communication system including a plurality of base stations and a plurality of receivers, each base station transmitting a respective CDMA signal including data intended for each of a set of one or more of the receivers, the data intended for each of the receivers being encoded in the CDMA signal using a respective spreading code for that receiver, the receiver including:
  reception means for receiving a signal including CDMA signals having a processing gain of N,
  a plurality of branch processing means, the reception means being capable of transmitting the received signal to each branch processing means, each branch processing means corresponding to a respective one of the base stations and arranged to modify the received signal by the operations of:
    (i) data equalization, based on a respective filter using a respective set of weights; and
    (ii) decoding the spreading code for the receiver;
  decision means for using an output of each branch processing means to generate an error signal and an estimate signal indicative of the data in the received signal intended for the receiver; and
  adaptation means for modifying the respective set of weights using the error signal
  wherein the CDMA signal transmitted by each base station is encoded using a respective scrambling code for that base station, and said decoding uses the scrambling code of the corresponding base station,
  wherein said decision means combines the outputs of the plurality of branch processing means into a combined signal,
  wherein said reception means:
  generates G measurements in each chip duration of the CDMA signal, where G is an integer;
  each of said set of weights consisting of G(2M+1) weights, where M is an integer;
  said combined signal being a sum over the branch processing means of the product of:
    (i) a vector derived from said spreading code for the receiver and a scrambling code of the corresponding base station;
    (ii) a data matrix composed of said measurements and having G(2M+1)×N components; and
    (iii) the set of weights for the respective branch processing means.

2. A receiver according to claim 1 in which the detection means is arranged to generate said error signal as the difference between said combined signal and a correction signal.

3. A receiver according to claim 2 in which said detection means includes a non-linear function unit for generating said correctiom signal from said combined signal using a non-linear function.

4. A receiver according to claim 2 in which the detection means includes a training sequence input for receiving a training sequence, and a switch for selectively deriving said correction signal as a signal input to said training sequence input or the output of the decision means.

5. A method of extracting data intended for a first user from one or more CDMA signals, each broadcast by a respective base station, each CDMA signal including data intended for the first user and data intended one or more other users, the data for each user being encoded using a respective spreading code, the method including:
  receiving a signal including the one or more CDMA signals wherein said CDMA signals have a processing gain of N,
  transmitting the received signal along a plurality of processing branches corresponding to different respective base stations;
  modifying the received signal in each processing branch by the operations of:
    (i) data equalization in respect of the corresponding base station, based on a respective set of weights; and
    (ii) decoding, using the spreading code for the first user;
  using an output signal generated from the outputs of each processing branch to derive an error signal and an estimate signal indicative of the data in the received signal intended for the first user; and
  modifying each respective set of weights using the error signals,
  wherein the CDMA signal transmitted by each base station is encoded using a respective scrambling code and said decoding uses the scrambling code of the corresponding base station,
  wherein said output signal comprises a combined signal oenerated by combining the outputs of the plurality of processing branches,
  wherein said step of receiving a signal includes generation G measurements in each chip duration of the CDMA signal, where G is an integer;
    each of said set of weights comprises G(2M+1) weights, where M is an integer; and
    said combined signal is a sum over the processing branches of the product of:
      (i) a vector derived from said speading code for the first receiver and the scrambling code of the corresponding base station;
      (ii) a data matrix composed of said measurements and having (G(2M+1)×N components, and
      (iii) the set of weights for the respective processing branch.

6. A method according to claim 5 in which said error signal is the difference between said combined signal and a correction signal.

7. A method according to claim 6 further including generating said correction signal from said contined signal using a non-linear function.

8. A method according to claim 6 further including deriving said correction signal as a selection from an input training sequence or the estimate signal.

* * * * *